United States Patent [19]
Inoue et al.

[11] 3,884,697
[45] May 20, 1975

[54] PHOTOGRAPHIC PROCESS UTILIZING SPIROPYRAN COMPOUND DISPERSED IN NITROCELLULOSE FILM WITH HIGH NITROGEN CONTENT

[75] Inventors: Eiichi Inoue; Mitsunobu Nakazawa, both of Tokyo, Japan

[73] Assignees: Eiichi Inoue, Japan; Dai Nippon Insatsu Kabushiki Kaisha, Japan; Canon Kabushiki Kaisha, Japan; part interest to each

[22] Filed: Mar. 19, 1974

[21] Appl. No.: 452,516

Related U.S. Application Data

[60] Division of Ser. No. 256,570, May 20, 1972, abandoned, which is a continuation-in-part of Ser. No. 20,410, March 17, 1970, abandoned.

[30] Foreign Application Priority Data

Mar. 31, 1969  Japan.................................. 44-23819

[52] U.S. Cl.................... 96/48 R; 96/89; 96/90 PC; 252/300
[51] Int. Cl................................................ G03c 5/24
[58] Field of Search.................. 96/90 PC, 48 R, 89; 252/300

[56] References Cited
UNITED STATES PATENTS

| | | | |
|---|---|---|---|
| 3,364,023 | 1/1968 | Becker et al...................... | 96/90 PC |
| 3,442,646 | 5/1969 | Amidon et al..................... | 96/90 PC |
| 3,667,949 | 6/1972 | Inoue et al....................... | 96/90 PC |

*Primary Examiner*—Won H. Louie, Jr.
*Attorney, Agent, or Firm*—Wenderoth, Lind & Ponack

[57] ABSTRACT

This invention relates to reverse photochromic nitrocellulose films which are produced by combining specific spiro-pyran compounds with specific types of nitrocellulose. Also, this invention relates to a method for producing the reverse photochromic nitrocellulose films. These reverse photochromic films are colored at room temperature and the coloring of the films can be erased by irradiation with visible light. The films can be restored to their original color when they are placed in the dark or when they are subjected to the irradiation with ultraviolet light. The novel films have superior color stability in the coloration-decoloration cycle.

2 Claims, No Drawings

PHOTOGRAPHIC PROCESS UTILIZING SPIROPYRAN COMPOUND DISPERSED IN NITROCELLULOSE FILMS WITH HIGH NITROGEN CONTENT

This is a divisional of Ser. No. 256,570 filed May 20, 1972, now abandoned, which is a continuation-in-part of Ser. No. 20,410 filed Mar. 17, 1970, now abandoned.

BRIEF SUMMARY OF THE INVENTION

This invention relates to reverse photochromic films, which are produced by combining certain spiro-pyran compounds with certain types of nitrocellulose, thus producing a stable photochromism wherein the films can be colored at room temperature and the color of the films can be erased under the irradiation of the visible light. However the films can be restored precisely to their original color when they are placed in the dark or when they are subjected to the irradiation with ultraviolet light.

The term "photochromism" can be defined as the phenomenon of reversible color change which is induced by the light excitation. Some spiro-pyran compounds have been found to exhibit photochromism and they are expected to have a wide range of applications due to their attractive properties. When such spiro-pyran compounds are dissolved into a liquid or combined with a polymer, the resultant product is colorless at room temperature and can be colored under excitation of the ultraviolet light but the developed color of the product can be decolored when the product is placed in the dark or is subjected to irradiation with visible light.

PRIOR ART

There have been found other spiro-pyran compounds which are stable in the colored state. Such spiro-pyran compounds exhibit reverse photochromism in that they are colored at room temperature and can be decolored by the irradiation of the visible light but their color can be restored when they are placed in the dark. Such spiro-pyran compounds can display reverse photochromism in aqueous solution or a polymer film.

An example of these spiro-pyran compounds is 1,3,3-trimethyl-indoline-8'-carboxyl-benzopyryl-spiran as disclosed in "The Journal of Japanese Chemical Society," Vol. 88, No. 10 (1967). Also, there are known solid substances in which such a spiro-pyran compound is absorbed or an admixture of such a spiro-pyran compound and a hydrogen-providing substance or a salt of such a spiro-pyran compound, which display the reverse photochromism as disclosed in "The Journal of Japanese Industrial and Chemical Society," Vol. 71, No. 8 (1968).

In the reverse photochromic phenomenon of the known spiro-pyran compounds as mentioned above, there was known only one way for restoring the original color of such compounds and this was by placing these compounds in the dark and the color is thermally developed after the color of such compounds was erased. Some of the known spiro-pyran compounds can be colored under excitation of the ultraviolet light after the color disappeared but the color is different from the original color of such compounds. For example, 1,3,3-trimethyl-indolenine-6'-nitro-benzopyryl-spiran and phthalic acid are mixed with polystyrene in the presence of a solvent and then a film is produced by evaporating the solvent. The film is yellow at room temperature and the yellow color of the film is erased by irradiation of the visible light. The colorless film is recolored in the original yellow by placing it in the dark but the colorless film attains a blue color when it is excited with ultraviolet light. The blue color of the film gradually vanishes, but the film becomes yellow when it is placed in the dark. Therefore, it should be noted that the known reverse photochromic films provide low color stability upon erasure and upon subsequent recolorations by irradiation with light.

DETAILED DESCRIPTION OF INVENTION

An object of this invention is to provide reverse photochromic nitrocellulose films containing certain spiropyran compounds which can be optionally colored or decolored by the irradiation of light.

Another object of this invention is to provide a method for producing such reverse photochromic nitrocellulose films. The films can be colored at room temperature and the color can be erased under irradiation with visible light but the films can be recolored to the original color when they are placed in the dark or subjected to irradiation with ultraviolet light.

The films, in accordance with this invention, can be produced by using the spiro-pyran compounds without the addition of any additives. The films have advantages and merits which are not expected for the known reverse photochromic films and they can be used as positive-positive type films in a wide range of application, such as the phototypesetting films, light-sensitive materials for the general printing plates, films for layout, copying materials and the like.

The spiro-pyran compounds used in this invention are 1,3,3-trimethyl-indoline-5-chloro-6'-nitro-benzopyryl-spiran, 1,3,3-trimethyl-indoline-5-methoxy-6'-nitro-benzopyryl-spiran, and 1,3,3-trimethyl-indoline-6'-carboxy-benzopyryl-spiran.

The compounds have the basic nucleus:

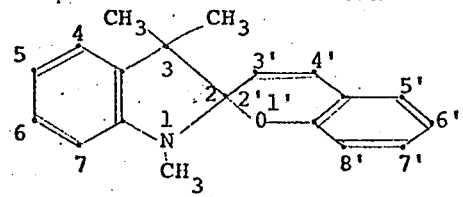

The nitrocelluloses used in this invention include those having a nitrogen content from about 10.0% to about 12.2% by weight and having a molecular weight of from about 10,000 to about 250,000. Suitable examples include Regular Soluble (R.S.) nitrocellulose having a nitrogen content of from 11.8% to 12.2%, Alcohol Soluble (A.S.) nitrocellulose having a nitrogen content of from 11.4% to 11.9% and Spirit Soluble (S.S.) nitrocellulose having a nitrogen content of from 10.8% to 11.1%, which are sold by the Daicell Kabushiki Kaisha, of Japan as well as nitrocellulose having about a 10% nitrogen content manufactured by Kokusan, Kagaka, Kabushiki Kaisha, of Japan. The spiro-pyrans are employed in an amount effective to produce stable reverse photochromic effect, e.g. about 1 part by weight per 60 parts by weight nitrocellulose.

It is considered that the reverse photochromic phenomenon indicated by the films of this invention depend on the cooperative action of the nitro-group or groups of the nitrocelluloses and the spiro-pyran because the usual photochromic films, which are produced by incorporating the spiro-pyran compounds with a polymer such as ethyl cellulose, methyl cellulose and acetyl cellulose, are colorless at room temperature and can be colored by irradiation of the ultraviolet light.

The reverse photochromic films of this invention can be produced by the conventional film-forming techniques. For example, the spiro-pyran compound and the nitrocellulose are dissolved in a solvent to form a solution and then the solution is spread over a suitable substrate, such as a glass plate or a metal plate to form a film, and then the film is dried and stripped off the substrate. Also, the solution is coated on a suitable supporting material, such as paper or a polymer film or a glass plate, and the coated material is dried by evaporation of the solvent. Such a dried material can be used as a light-sensitive material.

This invention is illustrated by the following Examples.

EXAMPLE 1

3 grams of A.S. nitrocellulose and 50 milligrams of 1,3,3-trimethyl-indoline-5-chloro-6'-nitro-benzopyryl-spiran were dissolved in a solvent mixture containing 10 cc of ethyl acetate and 10 cc of butyl acetate with agitation to produce a solution. Then, the solution was spread over a ferro-type plate (chromium is vacuum evaporated on a glass plate) to produce a thin film and then the coated plate was dried overnight at ambient temperature by maintaining it horizontally. Then, the plate was dried overnight at about 50°C in a vacuum and the thin film was stripped off from the plate. It was found that the thin film was colored magenta and had a maximum absorption spectra in the vicinity of the 550 m$\mu$ wave length. The colored thin film was subjected for about 20 seconds to the irradiation of 1 KW-tungsten lamp disposed at the distance of 30 centimeters from the film and it was found that the magenta color of the film was changed to colorless but also it was found that the decolored film was recolored into magenta when it was placed in the dark for several hours. Still further, the decolored film was subjected for 30 seconds to the irradiation of a xenon lamp disposed at the distance of about 20 centimeters from the film through UVD-25, which is a cut-filter for the visible light and sold under that trade name by Tokyo Shibaura Kabushiki Kaisha. It was found that the decolored film was recolored magenta. Such decoloring step and coloring step were repeated for 10 cycles and it was found that the color tone and the quality of the film was not degraded.

EXAMPLE 2

3 grams of R.S. nitrocellulose and 50 milligrams of 1,3,3-trimethyl-indoline-5-chloro-6'-nitro-benzopyryl-spiran were dissolved in 20 cc of cyclohexanone with agitation by using a stirrer to produce a solution. The solution was spread over a ferro-type plate to produce a thin film and a dried thin film was produced in the same manner as in Example 1. It was found that the thin film was colored magenta and had a maximum absorption spectra in the vicinity of the 550 m$\mu$ wave length as in Example 1.

A pattern was closely contacted with the thin film under vacuum and then the thin film was irradiated for one minute by using a 1 KW-tungsten lamp disposed at the distance of about 50 centimeters from the film. It was found that the magenta color of the film was erased corresponding to the pattern and a magenta colored positive image was formed on the thin film. Next, the positive imaged thin film was exposed for about one minute to the light of a 500 W-high pressure mercury lamp disposed at a distance of 30 centimeters from the film by using the UVD-25 filter and it was found that the colorless portion of the film was recolored magenta. The film was then restored to the original magenta colored film having no visible image.

EXAMPLE 3

The spiro pyran-containing nitrocellulose solution which was produced in Example 2 was coated on a supporting paper by using a Mayer's bar No. 16. The coated paper was dried overnight at room temperature to obtain a magenta colored light-sensitive paper.

A pattern was closely contacted with the magenta colored light-sensitive paper and then said paper was irradiated in the same manner as in Example 2. It was found that the magenta color of said paper was erased corresponding to the pattern and a magenta colored positive image was formed on said supporting paper. Next, the positive imaged paper was placed in the dark for about 2 hours and it was found that the colorless portion was recolored magenta to produce the magenta colored original light sensitive paper having no image.

EXAMPLE 4

3 grams of S.S. nitrocellulose and 50 milligrams of 1,3,3-trimethyl-indoline-5-chloro-6'-nitro-benzopyryl-spiran were dissolved in a solvent mixture containing 10 cc of ethanol and 10 cc of toluene to produce a solution. The solution was spread over a ferro-type plate to produce a thin film thereon and a dry thin film was produced in the same manner as in Example 1. It was found that the thin film was magenta colored and had a maximum absorption spectra in the vicinity of the 550 m$\mu$ wave length as in Example 1. A first pattern was closely contacted with the magenta colored thin film under vacuum and then the thin film was irradiated for one minute by using a 1 KW-tungsten lamp disposed at a distance of 50 centimeters from the thin film to form a colored positive image on the thin film.

Next, a part of the colored positive image was masked with a black paper and then it was subjected for one minute to irradiation with a 200 volt-30 ampere-carbon arc lamp disposed at a distance of about one meter from the thin film by using the UVD-25 filter and it was found that the unmasked colorless part was recolored magenta. This colored part was closely contacted with a second pattern and irradiated with 1 KW-tungsten lamp in the same manner as mentioned above to form a new colored image corresponding to the second pattern. There resulted a partly modified positive image formed on the thin film. The partly modified positive image was printed on the Kodak lith-film by using the VY-49 filter which is sold under such trade name by Tokyo Shibaura Kabushiki Kaisha and a light source for the enlarger, and it was found that a good image was printed on the lith-film.

EXAMPLE 5

The spiro-pyran-containing nitrocellulose film which was produced in Example 4 was closely contacted with a first pattern and exposed by using the 1 KW-tungsten lamp in the same manner as in Example 4 to form a magenta colored positive image on the film. Then, the part of the magenta colored positive image was masked and irradiated for one minute with a 1 KW-tungsten lamp disposed at the distance of 50 centimeters from the film and it was found that the magenta color of the part was erased and the part became transparent.

Next, the transparent part was closely contacted with a second pattern under vacuum and then irradiated for one minute with the light of the 200 volt-30 ampere-carbon arc lamp through the UVD-25 filter disposed at the distance of about one meter from the film and it was found that the transparent part was recolored magenta corresponding to the second pattern and formed a new magenta colored positive image. As a result, the partly modified positive image was formed on the film and it was found that the partly modified positive image can be printed on the Kodak lith-film to form a good image in the same manner as in Example 4.

EXAMPLE 6

A spiro-pyran-containing A.S. nitrocellulose film was prepared by replacing the 1,3,3-trimethyl-indoline-5-chloro-6'-nitro-benzopyryl-spiran with 1,3,3-trimethyl-indoline-6'-carboxy-benzopyryl-spiran in the same manner as in Example 1. The film was orange colored and has a better sensibility to the visible light, as compared with the film of Example 1. The orange color of this film was erased when it was irradiated for a period of 5 to 10 seconds with the light of the 1 KW-tungsten lamp and a colorless transparent film was produced. The colorless transparent film was recolored into the original orange when it was placed for about 12 hours in the dark or irradiated with the ultraviolet light (the visible light was cut) for 30 seconds by using the xenon lamp.

EXAMPLE 7

3 grams of R.S. nitrocellulose and 50 milligrams of 1,3,3-trimethyl-indoline-5-methoxy-6'-nitro-benzopyryl-spiran were dissolved in 20 cc of cyclohexanone with agitation by using a stirrer to produce a solution. Then the solution was spread over a clean washed glass plate by using a Mayer's bar to produce a thin film and then the coated plate was dried overnight at room temperature and was then dried overnight at 50°C under vacuum to produce a violet colored thin film. The colored thin film was closely contacted with a pattern and irradiated with the light of a 1 KW-tungsten lamp in the same manner as in Example 2 and it was found that the violet color of the film was erased corresponding to the pattern and also that a violet colored positive image was formed on the glass plate. Also, the colored image disappeared when the film was irradiated with ultraviolet or placed in the dark for a long period because the colorless part of the film was recolored violet.

EXAMPLE 8

50 milligrams of 1,3,3-trimethyl-indoline-6'-carboxy-benzopyryl-spiran and 3 grams of nitrocellulose having the nitrogen content of about 10%, which is manufactured and sold by Kokusan Kagaku Kabushiki Kaisha, were dissolved in a solvent mixture containing 10 cc of ethyl acetate and 10 cc of butyl acetate to produce a solution. The solution is used for producing a thin film in the same manner as in Example 1. This film was brown. It was also found that the brown film is a reverse photochromic one.

We claim:

1. A method for producing a reversible color change image by the use of a reverse photochromic film consisting essentially of nitrocellulose having a nitrogen content of from about 10 to 12.2% by weight and a molecular weight of about 10,000 to 250,000 and a spiro-pyran compound being present in an amount of about 1 part by weight per 60 parts by weight nitrocellulose, said method comprising (i) decoloring said reverse photochromic film, which is originally colored and in a stable state, by subjecting it to irradiation with visible light to form an image, and (ii) restoring the decolored image to the original color by subjecting the film to irradiation with ultraviolet light or by placing the film in the dark.

2. A method for producing a reversible color change image according to claim 1, wherein the spiro-pyran compound is selected from the group consisting of:
    1,3,3-trimethyl-indoline-5-chloro-6'-nitro-benzopyryl-spiran,
    1,3,3-trimethyl-indoline-5-methoxy-6'-nitro-benzopyryl-spiran,
    and 1,3,3-trimethyl-indoline-6'-carboxy-benzopyryl-spiran.

* * * * *